(12) United States Patent
Combs et al.

(10) Patent No.: US 10,945,483 B2
(45) Date of Patent: Mar. 16, 2021

(54) MOLDING PROCESS FOR RUBBER (71) Applicant: Weyco Group, Inc., Milwaukee, WI (US)

(72) Inventors: William Combs, West Linn, OR (US); He Chao Feng, DongGuan (CN)

(73) Assignee: Weyco Group, Inc., Milwaukee, WI (US)

( * ) Notice: Subject to any disclaimer, the term of this patent is extended or adjusted under 35 U.S.C. 154(b) by 82 days.

(21) Appl. No.: 16/153,349

(22) Filed: Oct. 5, 2018

(65) Prior Publication Data

US 2019/0104801 A1  Apr. 11, 2019

Related U.S. Application Data (60) Provisional application No. 62/568,814, filed on Oct. 6, 2017.

(51) Int. Cl.
| | |
|---|---|
| *B29D 35/02* | (2010.01) |
| *A43B 1/10* | (2006.01) |
| *B29C 35/02* | (2006.01) |
| *A43B 3/02* | (2006.01) |
| *A43B 23/02* | (2006.01) |
| *A43B 23/04* | (2006.01) |
| *A43D 3/02* | (2006.01) |
| *B29K 23/00* | (2006.01) |
| *B29K 9/06* | (2006.01) |
| *B29L 31/50* | (2006.01) |
| *B29K 7/00* | (2006.01) |

(52) U.S. Cl.
CPC ............... *A43B 1/10* (2013.01); *A43B 3/02* (2013.01); *A43B 23/0205* (2013.01); *A43B 23/042* (2013.01); *A43D 3/026* (2013.01); *B29C 35/02* (2013.01); *B29D 35/02* (2013.01); *B29K 2007/00* (2013.01); *B29K 2009/06* (2013.01); *B29K 2023/22* (2013.01); *B29L 2031/501* (2013.01)

(58) Field of Classification Search
CPC .... A43B 1/10; A43B 1/12; A43B 3/02; A43B 3/04; A43B 23/0205; A43B 23/042; A43D 3/026; B29C 35/02; B29D 35/02
See application file for complete search history.

(56) References Cited

U.S. PATENT DOCUMENTS 1,881,248 A * 10/1932 Steppe .................. B29D 35/02
425/383
2,068,239 A * 1/1937 Maim .................. B29D 35/02
264/161

(Continued)

*Primary Examiner* — Ted Kavanaugh
(74) *Attorney, Agent, or Firm* — Boyle Fredrickson, S.C.

(57) ABSTRACT

A one-piece rubber boot shell is created by a process comprising the steps of disposing rubber pieces within a cavity of a molding machine, the molding machine having an upper mold, a lower mold, and a last suspended between the upper mold and the lower mold. The process includes closing the molding machine by moving at least one of the upper mold, the lower mold, and the last toward each other so that they are adjacent each other, heating the rubber pieces to flow within the cavity and around the last to form a one-piece rubber boot shell, and opening the molding machine by moving at least one of the upper mold, the lower mold, and the last away from each other so that they are spaced apart from each. The one-piece rubber boot shell is then removed from the last.

18 Claims, 8 Drawing Sheets

(56) References Cited

U.S. PATENT DOCUMENTS

| | | | | |
|---|---|---|---|---|
| 2,860,425 A | * | 11/1958 | Jackson | A43B 3/16 36/7.3 |
| 3,324,220 A | * | 6/1967 | Stansfield | B29D 35/04 264/244 |
| 4,246,707 A | * | 1/1981 | Pedersen | A43B 3/16 36/100 |
| 5,024,008 A | * | 6/1991 | Maples | A43B 3/0031 36/1 |
| 5,743,027 A | * | 4/1998 | Barma | A43B 1/10 12/142 D |
| 8,361,369 B1 | | 1/2013 | Cook et al. | |
| 8,641,953 B2 | | 2/2014 | Cook et al. | |
| 8,883,058 B2 | | 11/2014 | Cook et al. | |
| 8,974,711 B2 | | 3/2015 | Cook et al. | |
| 2018/0213883 A1 | * | 8/2018 | Engelhardt | A43B 5/18 |

\* cited by examiner

MOLDING PROCESS FOR RUBBER

CROSS-REFERENCE TO RELATED APPLICATION

This application claims priority to U.S. Application No. 62/568,814 filed on Oct. 6, 2017, the entire contents of which are hereby expressly incorporated by reference into this application.

BACKGROUND OF THE INVENTION

1. Field of the Invention

The present invention relates to a molding process for manufacturing a rubber boot.

2. Discussion of the Related Art

Natural rubber boots are highly desirable for their flexibility, chemical resistance and ability to resist slipping. Unfortunately, because of the viscosity of natural rubber, it has been impossible to create a natural rubber boot in one piece. Instead, other materials having similar but less desirable characteristics have been added to rubber or used instead of rubber to facilitate the formation of a boot (outsole and upper) in a single piece. Alternatively, multiple pieces of rubber have been glued together and vulcanized to create a full rubber boot. While the full rubber boot has the benefit of all the positive characteristics of rubber, the available methods of construction leave seams that can separate over time.

Where alternative materials are used (e.g., PVC or TPR), the typical process is to injection mold the boot (the outsole and the upper) as a single piece using conventional techniques. An insert, such as a neoprene sleeve, is then connected to the one-piece outsole and upper to form the boot.

Where a natural rubber boot is desired, the outsole of the boot is first formed in a mold specifically for the creation of the outsole. Pieces of rubber are placed into the mold, and then the mold is closed, heated to the appropriate temperature and then allowed to cool. The outsole is then removed from the mold. Pieces of sheet rubber are then die cut to be formed into the upper. Then, using a last, the rubber pieces are glued to the outsole and an insert (generally in the form of a neoprene sleeve) to form the boot. Once glued together, the combination of elements is then vulcanized in an oven at approximately 130° Celsius (266° Fahrenheit) for approximately 70 minutes.

As noted above, this process creates seams where the rubber from the die cut sheets of rubber overlap each other and the outsole of the boot. Air can also be trapped between the overlays creating weakness in the joints. The result is a rubber boot that may crack or separate at the seams as stress is put on the seams during motion associated with normal use of the boot.

Boot manufactures have used the above methods for forming rubber and rubber-like boot shells because natural rubber cannot be injection molded. That is, because of its viscosity, rubber does not flow fast enough to fill the mold before it begins to cure. As a result, a rubber product as large as a boot shell could not be injection molded.

In order to facilitate larger scale manufacturing, boot manufacturers often add plastics or other synthetic materials such as thermoplastic polyurethane (TPU), thermoplastic rubber (TPR), polyvinyl chloride (PVC), polyurethane (PU), thermoplastic elastomer (TPE), etc. to rubber to create lower viscosity to permit injection molding of boot shells. However, the polymers resulting from the combination of rubber and plastics creates a product that is less desirable than a natural rubber boot, lacking in, among other things, durability and slip resistance that is inherent in the use of pure rubber.

Therefore, there is a need in the art for an efficient molding process that forms a one-piece rubber boot shell that does not including the addition of plastics or other synthetic materials.

SUMMARY OF THE INVENTION

The present invention is directed, in part, to a molding process that is used to form a one-piece natural rubber boot shell that does not result in a boot having the points of weakness associated with prior art processes.

In accordance with one embodiment of the invention, a one-piece rubber boot shell is created by a process including disposing rubber pieces within a cavity of a molding machine. The molding machine has an upper mold, a lower mold, and a last suspended between the upper mold and the lower mold. The molding machine is closed on the rubber pieces within the mold by moving at least one of the upper mold, the lower mold, and the last toward each other so that they are adjacent to each other but with gaps therebetween. The rubber pieces are then heated to flow within the cavity and around the last to form a one-piece rubber boot shell. The molding machine is opened by moving at least one of the upper mold, the lower mold, and the last away from each other so that they are spaced apart from each and removing the one-piece rubber boot shell from the last.

The rubber pieces are heated to at least approximately 155° Celsius for at least approximately 800 seconds. The resulting one-piece rubber boot shell is then preferably cooled to approximately 150° Celsius or lower over a period of 10 seconds or more.

In accordance with another embodiment of the invention, a natural rubber boot includes a one-piece molded boot shell having an outer surface and a sole, the boot shell is made of rubber without any polymeric additives and a boot insert disposed within the rubber boot shell and extending upwardly through an opening of the one-piece boot shell.

In accordance with yet another embodiment of the invention, a method of manufacturing a one-piece natural rubber boot shell includes opening a molding machine having an upper mold, a lower mold and a last disposed at a lower end of the arm. The method further includes disposing a first set of rubber pieces on an outer surface of the last, disposing a second set of rubber pieces on an inner surface of the lower mold, and closing the molding machine by moving at least one of the upper mold, the lower mold, and the last toward each other to form a full boot shell mold. The method also includes heating the first and second sets of rubber pieces so that the rubber flows within the mold and around the last to form a one-piece rubber boot shell, opening the molding machine by moving at least one of the upper mold, the lower mold, and the last away from each other, and removing the one-piece rubber boot shell from the last.

According to another aspect of the invention, closing the molding machine forms a cavity between the inner surface of the upper mold, the inner surface of the lower mold, and the outer surface of the last. In addition, the molding machine may include an arm such that when the rubber flows within the mold and around the last, it also flows around the arm, which creates an opening in an upper portion of the one-piece rubber boot shell.

Despite the apparent simplicity of the present invention, applicant is unaware of anyone who has been able to successfully mold a complete boot shell in natural rubber, without the addition of polymeric materials or the creation of seams. While facially simple, the nature of natural rubber has precluded the manufacture of single piece rubber boots by all known molding processes until applicant's current invention of the present mold and manufacturing process.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiments of the invention which are illustrated in the drawings, specific terminology will be resorted to for the sake of clarity. However, it is not intended that the invention be limited to the specific terms so selected and it is to be understood that each specific term includes technical equivalents which operate in a similar manner to accomplish a similar purpose.

DETAILED DESCRIPTION OF PREFERRED EMBODIMENTS

The present invention and the various features and advantageous details thereof are explained more fully with reference to the non-limiting embodiments described in detail in the following description.

Figure 1:
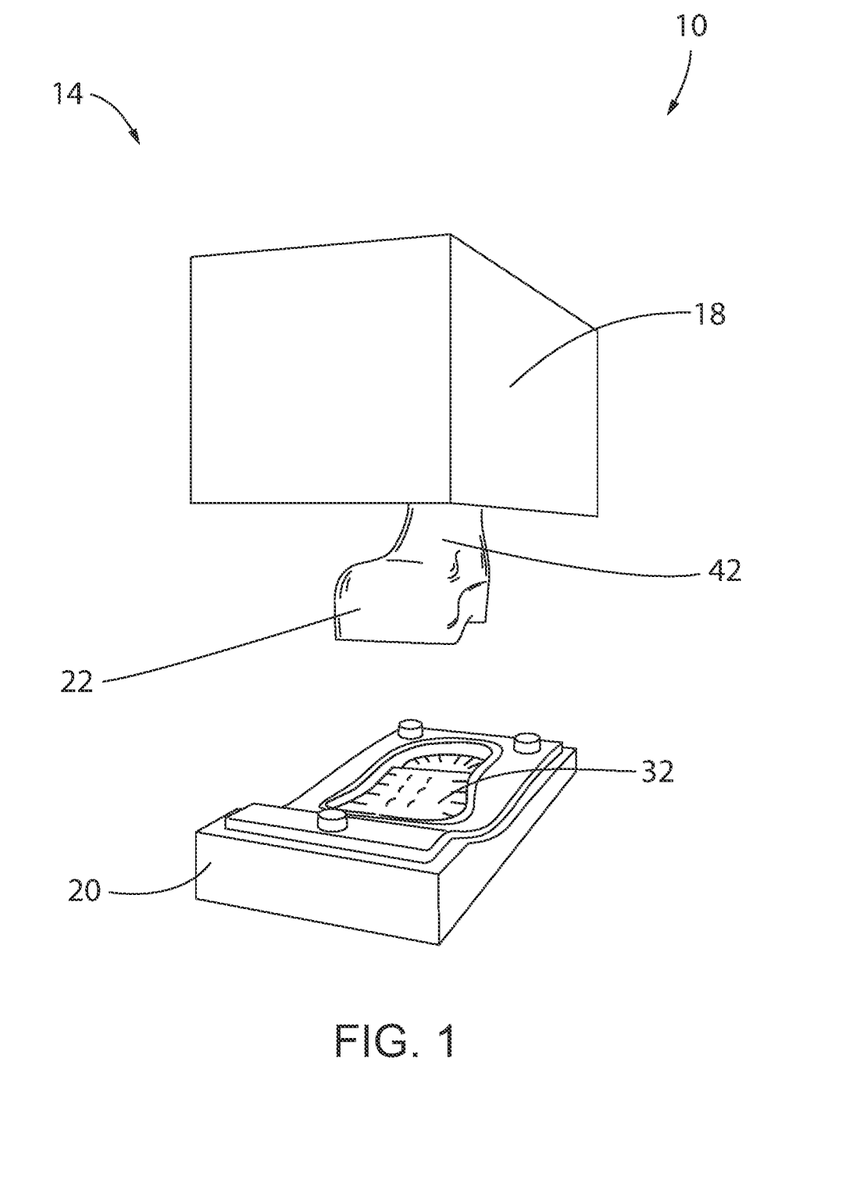
FIG. 1 is a front perspective view of a molding machine in an open position, according to an embodiment of the invention.
Figure 2:
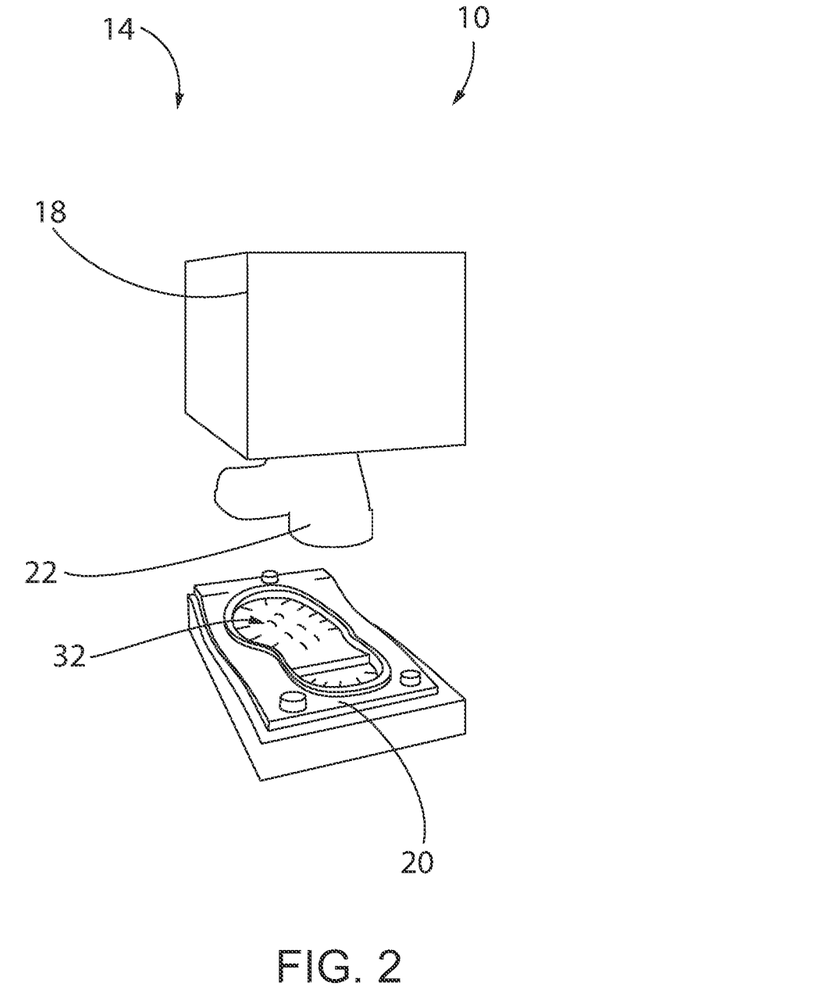
FIG. 2 is a rear perspective view of the molding machine of FIG. 1 in an open position.
Figure 3:
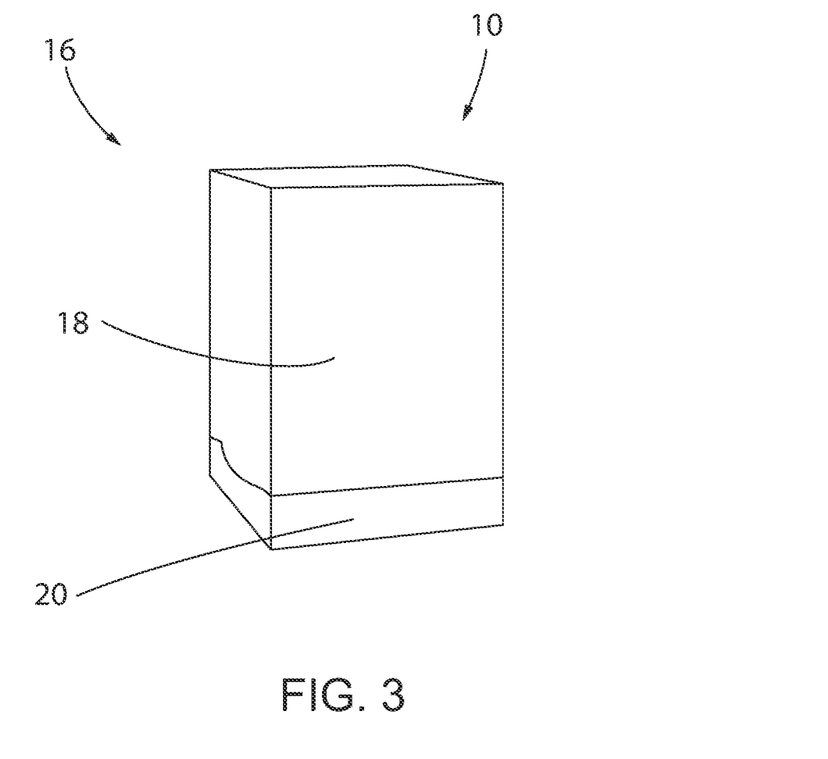
FIG. 3 is a front perspective view of the molding machine of FIG. 1 in a closed position.

Referring now to FIGS. 1-3, perspective views of a molding machine 10 for making a one-piece rubber boot shell 12 having at least an outsole 34 and an upper portion 60, in accordance with the present invention are shown. In FIGS. 1 and 2, the molding machine 10 is illustrated in an open position 14, while FIG. 3 illustrates the molding machine 10 in a closed position 16. The molding machine 10 includes an upper mold 18 and a lower mold 20. The upper mold 18 includes a last 22 extending from an inner surface 24 of the upper mold 18. In the representative embodiment of the invention, the last 22 is suspended between the upper mold 18 and the lower mold 20 by an arm 26. The last 22 may be disposed at a lower end 27 of the arm 26.

The last 22 is in a shape consistent with the inside of a boot, since an outer surface 28 of the last 22 forms an inner surface (not shown) of the boot shell 12. The inner surface 24 of the upper mold 18 is contoured to the preferred shape of the outer surface 30 of the upper portion 60 of the boot shell 12. The inner surface 32 of the lower mold 20 is contoured to the preferred shape of the sole 34 of the boot shell 12.

When the molding machine 10 is in the open position 14, the upper and lower molds 18, 20 are separated and the arm 26 extends downwardly from the upper mold 18 to suspend the last 22 in order to provide a user with the ability to place rubber pieces 36 on the outer surface 28 of the last 22 and on the inner surface 20 of the lower mold 22. In various embodiments of the invention, one or more rubber pieces 36 in the shape of blocks, strips, or any other suitable shape are placed on the outer surface 38 of the last 22 and the inner surface 20 of the lower mold 22.

When the molding machine 10 is in the closed position 16, the upper and lower molds 18, 20 are brought together to create a substantially contiguous cavity 38 that the last 22 is suspended and enclosed within. The cavity 38 is formed by the inner surface 24 of the upper mold 18 and the inner surface 32 of the lower mold 20. The last 22 is disposed within the cavity 38 and spaced apart from the inner surfaces 24, 32 of the upper and lower molds 18, 20, respectively, such that all three parts effectively form a boot shell mold 40. The last 22 is held within the cavity 38 by the arm 26. Heat is applied to the mold and the rubber pieces 36 are heated and flow within the mold 40 to fill the cavity 38 around the last 22.

Figure 4:
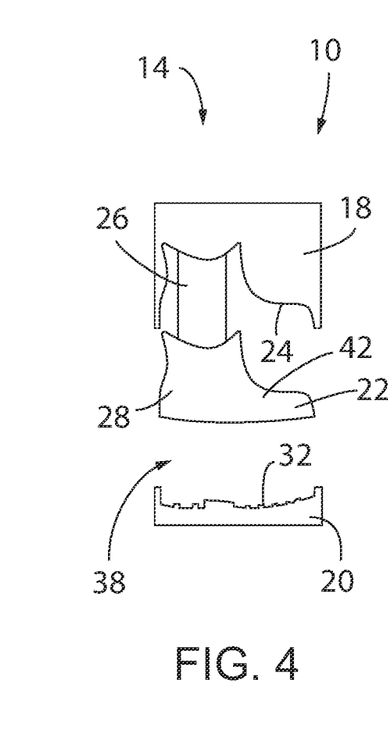
FIG. 4 is a side view sectional view of the molding machine of FIG. 1 in the open position.

FIGS. 4-7 depict sectional views of the molding machine 10 during various steps of the molding process, which will be later described in further detail. FIG. 4 depicts the molding machine 10 in the open position 14. As previously discussed, the upper mold 18 is spaced apart from the lower mold 20. Further, the arm 26 extends from the inner surface 24 of the upper mold 18 and suspends the last 22, which is in the form of the inside of a boot, therefrom. Thus, the last 22 is suspended between the inner surface 24 of the upper mold 18 and the inner surface 32 of the lower mold 20. It should be noted that FIGS. 1-7 are for illustrative purposes only. That is, the last 22 may be spaced closer to or further from the inner surface 24 of the upper mold in the open and closed positions 14, 16. In addition, the last 22 may be spaced closer to or further from the inner surface 32 of the lower mold 20 in the open and closed positions 14, 16. Still further, as described in more detail below, the last may be fixed within or relative to the upper mold. Alternatively, it may move within or relative to the upper mold. These various juxtapositions are intended to allow the upper mold to mate with and achieve a seal with the lower mold, leaving the last properly position relative to the upper and lower mold to cooperate to create the appropriate cavities for forming the boot outsole and upper.

Figure 5:
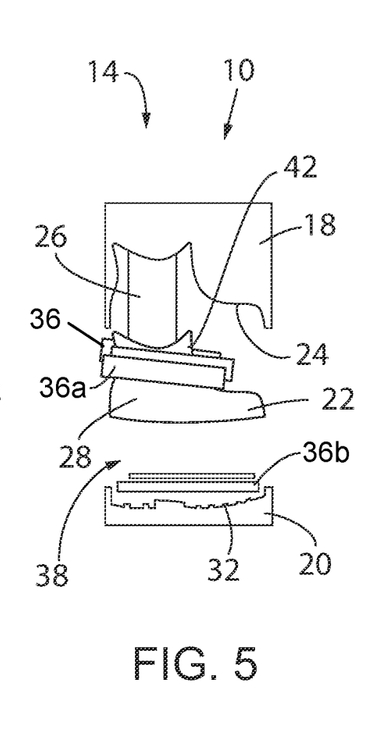
FIG. 5 is a side view sectional view of the molding machine of FIG. 1 in the open position with rubber pieces inserted into the molding machine.

FIG. 5 illustrates a preferred placement of rubber pieces 36 within the mold 40. A first set of one or more rubber pieces 36a is preferably disposed on the outer surface 28 of the last 22. A second set of one or more rubber pieces 36b is preferably placed on the inner surface 32 of the lower mold 20. In the representative embodiment of the invention, the first set of one or more rubber piece(s) 36a applied to the outer surface 38 of the last 22 is applied to an upper portion 42 of the last 22. The first set of one or more rubber piece(s) 36a is situated on the last 22 in a manner sufficient to prevent it from slipping off the last 22 while the molding machine 10 transitions from the open position 14 to the closed position 16.

In alternative embodiments of the invention, the first set of one or more rubber piece(s) 36a may be applied on the outer surface 28 of the last 22 at any location using various means to maintain the set of one or more rubber piece(s) 36a in place on the outer surface 28. In addition, while FIG. 5 illustrates the first set of rubber pieces 36a having three (3) rubber pieces and the second set of rubber pieces 36b having two (2) rubber pieces, other embodiments of the invention may use first and second sets of rubber pieces 36a, 36b individually including any number of rubber pieces that are effective to provide sufficient material for the molding process.

Figure 6:
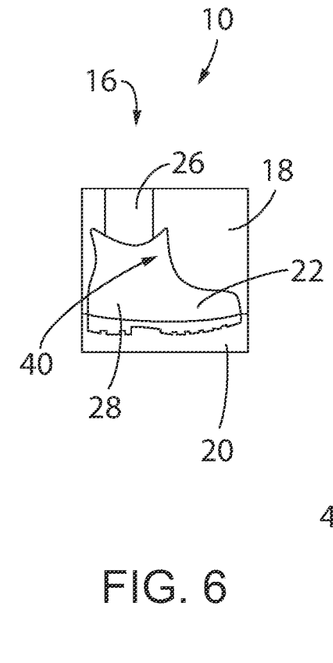
FIG. 6 is a side view sectional view of the molding machine of FIG. 1 in the closed position.

FIG. 6 depicts the molding machine 10 in the closed position 16. The upper and lower molds 18, 20 are brought together to seal and form the cavity 38 with the last 22 suspended therein, which creates the mold 40 for the boot shell 12. The mold 40 thus consists of the remaining space within the cavity 38 between the inner surfaces 24, 32 of the upper and lower molds 18, 20, respectively, and the last 22. As will be described in further detail, the rubber pieces 36 are heated within the mold 40 while the molding machine 10 is in the closed position 16, so that the rubber pieces 36 flow and fill the mold 40. Once cooled, the rubber pieces 36 that had melted and filled the mold 40 form a one-piece boot shell 12 having a sole 34 and an upper portion 60 integrally formed with each other.

In various embodiments of the invention, the components of the molding machine 10 may move differently in order to transition from the open position 14 to the closed position 16. For instance, the upper mold 18 may be held stationary, while the arm 26 moves to lift the last 22 to a location adjacent the inner surface 24 of the upper mold 18 and the lower mold 20 moves upward to a location adjacent the last 22 and in contact with the upper mold 18, in order to enclose the cavity 38 and form the mold 40. Alternatively, the upper mold 18 and the last 22 may be held stationary, while the lower mold 20 is moved upward to a location adjacent the last 22 and in contact with the upper mold 18. In another example, the last 22 may be held stationary while the upper mold 18 moves downward and the lower mold moves 20 to locations adjacent the last 22 so as to enclose the cavity 38 to form the mold 40. In yet another example, the lower mold 20 may be held stationary, while the arm 26 moves to lower the last 22 to a location adjacent the inner surface 32 of the lower mold 20 and the upper mold 18 moves downward to a location adjacent the last 22 in order to enclose the cavity 38 to form the mold 40. Still in another example, the lower mold 20 and the last 22 may be held stationary, while the upper mold 18 is moved downward to a location adjacent the last 22 and in contact with the lower mold 20. In other examples, the upper mold 18, last 22, and lower mold 20 may each move in order to place the last 22 in a location adjacent the inner surfaces 24, 32 of the upper and lower molds 18, 20, respectively, to enclose the cavity 38 to form the mold 40. Regardless of the various movements of the pieces of the mold relative to each other, in all cases three elements are required, a mold for the outsole, a last to form the inner portion of the boot, and a mold to form the outside portion of the upper of the boot. It should be noted that these three elements can be themselves formed of multiple pieces that move (or not) relative to each other.

Figure 7:
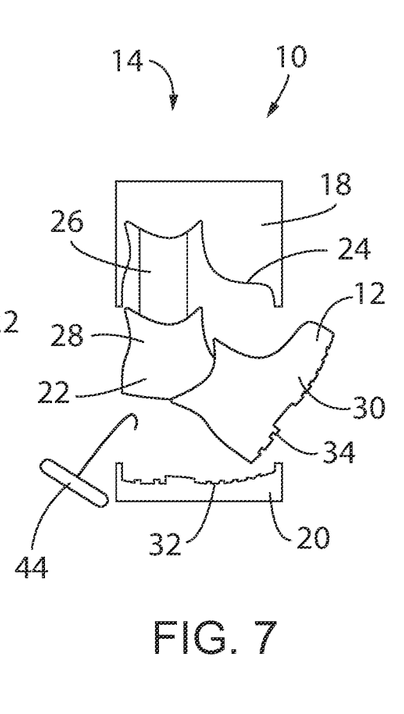
FIG. 7 is a side sectional view of the molding machine of FIG. 1 in the open position removing a finished one-piece rubber boot shell therefrom.

FIG. 7 illustrates the molding machine 10 in the open position 14 after the rubber pieces 36 have melted, filled the mold 40, and cooled to form the boot shell 12. As shown, the upper and lower molds 18, 20 are displaced from each other and the last 22 to transition the molding machine 10 in the open position 14. A tool 44, such as, but not limited to, a hook, is used to remove the boot shell 12 from the last 22—either automatically or by hand. Once the boot shell 12 has been removed from the last 22 and the molding machine 10 is free from any debris, rubber pieces 36 may again be added to begin creating the next boot shell 12.

Figure 8:
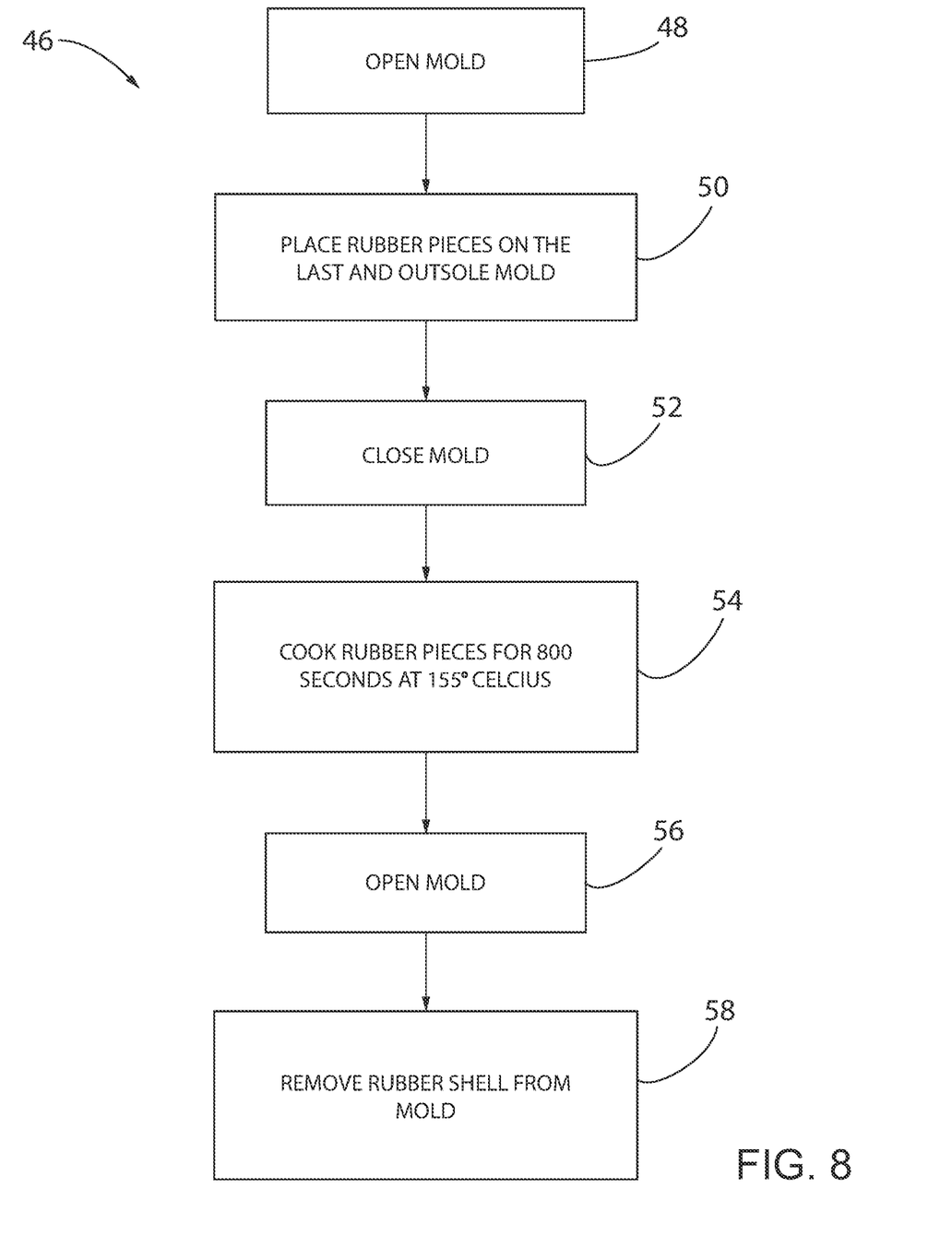
FIG. 8 is a block diagram of the method of forming a one-piece rubber boot shell in accordance with one embodiment of the present invention.

Referring to FIG. 8, a block diagram is shown depicting the method 46 of forming the boot shell 12. In the first step 48 of the method 46, the molding machine 10 is in the open position 16. In the next step 50, the rubber pieces 36 are placed on the outer surface 28 of the last 22 and the inner surface 32 of the lower mold 20, as described above, with respect to FIG. 5.

In the next step 52, the molding machine 10 is closed to form the mold 40. The rubber pieces 36 are disposed in the mold 40 between the outer surface 28 of the last 22 and the inner surfaces 24, 32 of the upper and lower molds 18, 20, respectively. In step 54, the rubber pieces 36 are then heated as the temperature within the mold 40 is raised to approximately at least 155° Celsius (311° Fahrenheit) for approximately at least 800 seconds in order to melt the rubber pieces 36 and have them flow throughout the entire mold 40 to encapsulate the last 22 and form the boot shell 12.

Once the application of heat is completed, and the boot shell 12 has cooled to approximately 150° Celsius and solidified (generally a time period of approximately 10 seconds, depending on the ambient temperature), the molding machine 10 is opened in step 56. Once the molding machine 10 is in the open position 14, the boot shell 12 covering the last 22 is exposed and spaced apart from the inner surfaces 24, 32 of the upper and lower molds 18, 20, respectively. In step 58, the boot shell 12 is then removed from the last 22 by use of a tool 44 as may be necessary.

Figure 9:
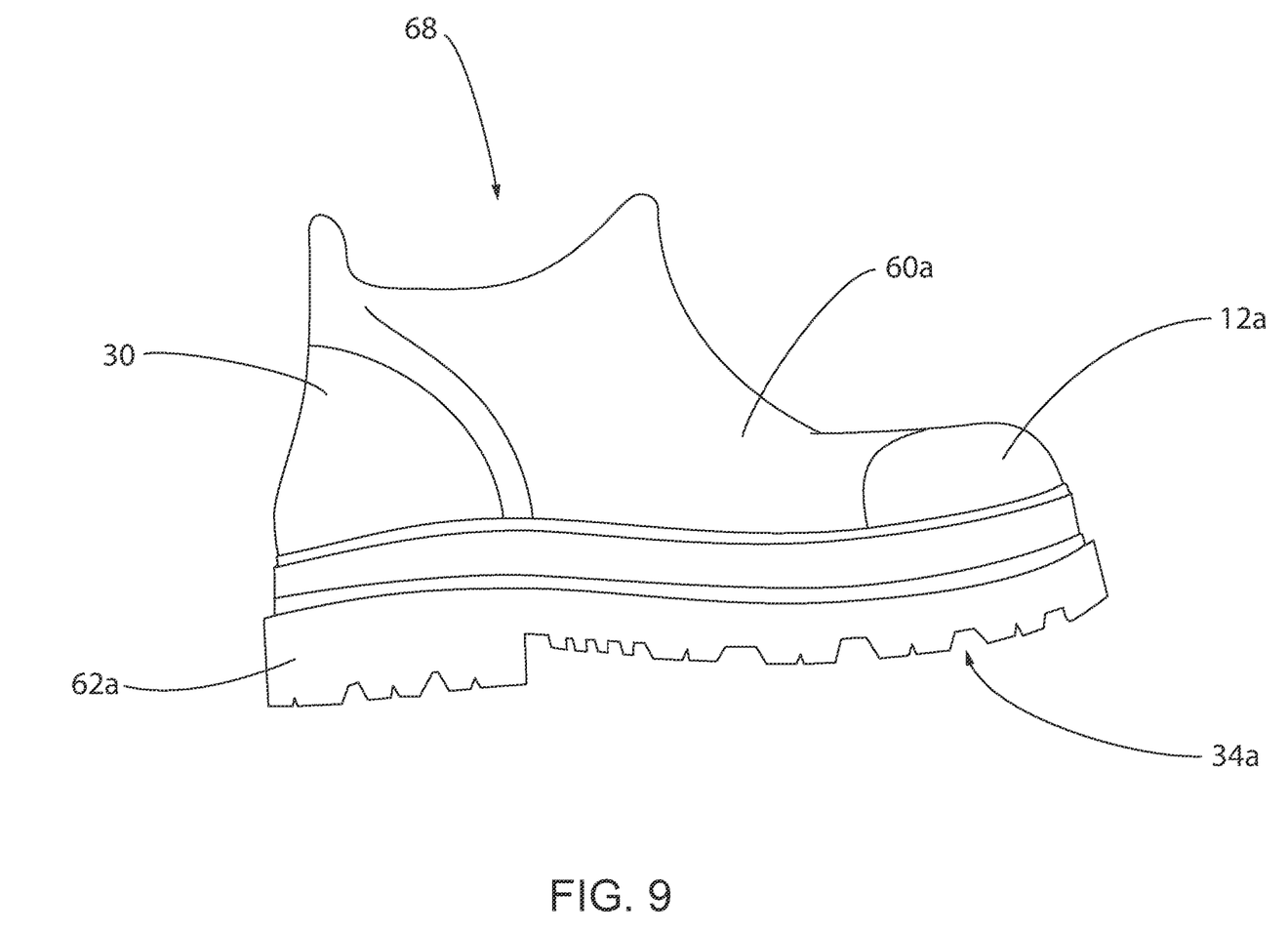
FIG. 9 is a side view of a finished one-piece rubber boot shell, according to one embodiment of the invention.
Figure 10:
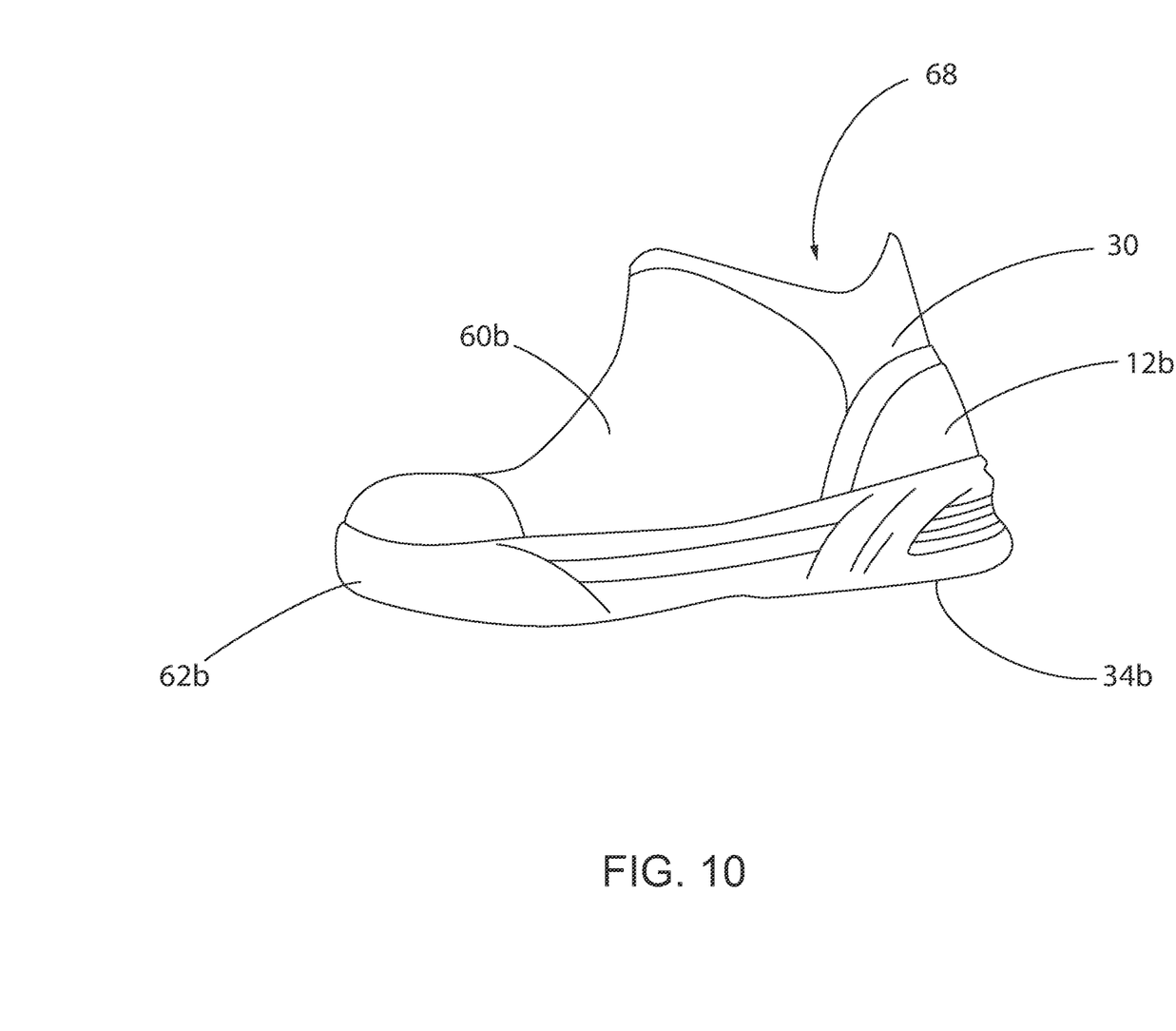
FIG. 10 is a side view of a finished one-piece rubber boot shell, according to another embodiment of the invention.

FIGS. 9 and 10 illustrate alternative boot shells 12a, 12b that may be manufactured by the method 46 described above. The variances in the boot shells 12a, 12b are a result of variances in the upper molds 18a, 18b and the lower molds 20a, 20b of the molding machine 10a, 10b. For instance, a molding machine 10a is used to manufacture the boot shell 12a of FIG. 9. The contours of the upper portion 60a of the boot shell 12a match the contours of the upper mold 18a of the molding machine 10a. Meanwhile the contours of the lower portion 62a and sole 34a of the boot shell 12a match the contours of the lower mold 20a of the molding machine 10a.

Similarly, the boot shell 12b of FIG. 10 was formed by a molding machine 10b. The contours of the upper portion 60b of the boot shell 12b match the contours of the upper mold 18b of the molding machine 10b, while the contours of the lower portion 62b and the sole 34b of the boot shell 12b match the contours of the lower mold 20b of the molding machine 10b.

While the contours of the upper and lower portions 60, 62 of the boot shell 12 may be redesigned and changed by changing the contours of the upper and lower molds 18, 20, each boot shell 12 resulting from the method 46 described above is a one-piece rubber boot shell. That is, the rubber pieces 36 used to manufacture the boot shell 12 melt and flow in order to form a single rubber piece that encapsulates the last 22. The resulting one-piece rubber boot shell 12 is free of seams and joints associated with other rubber boots, which can become failure points for cracking and separation of the boot.

Figure 11:
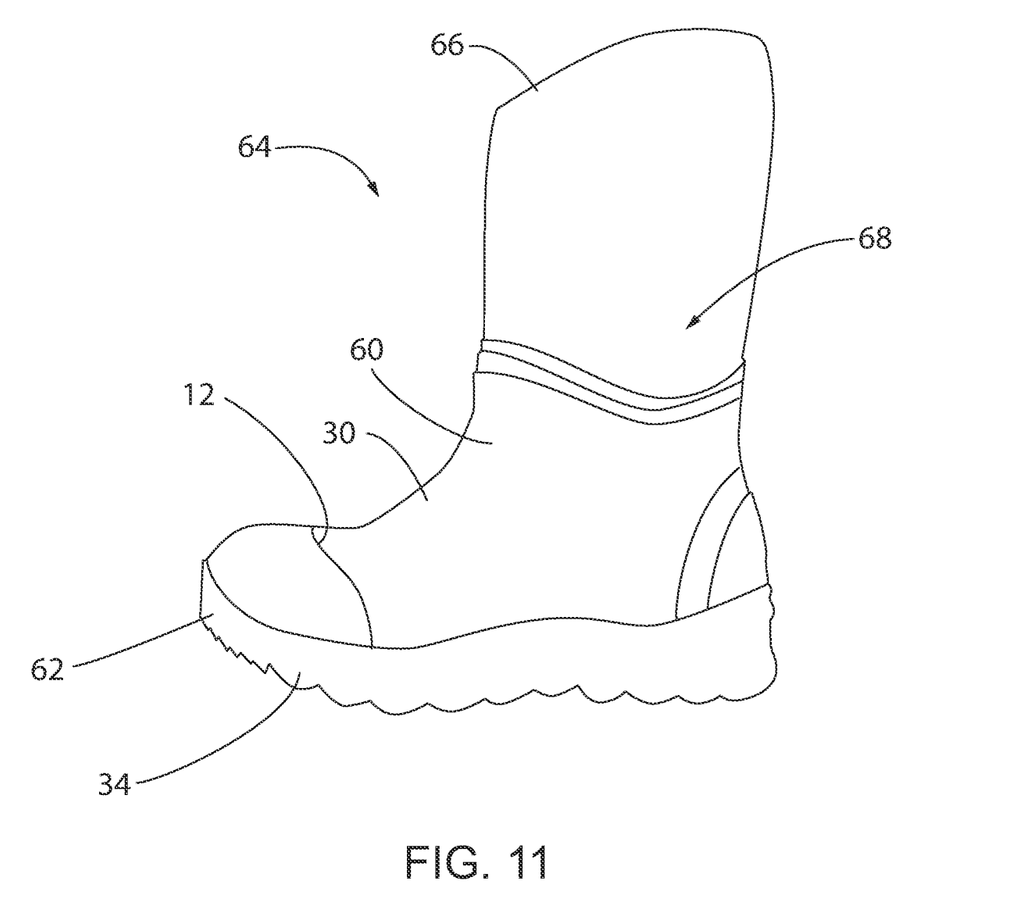
FIG. 11 is a perspective view of a finished boot having the one-piece rubber boot shell of FIG. 10.

FIG. 11 illustrates a side view of a boot 64 including the boot shell 12b of FIG. 10. The finished boot 64 preferably includes a boot insert 66 disposed within the boot shell 12b and extending out an opening 68 of the boot shell 12b. The boot insert 66 may comprise a neoprene material. Further, the boot shell 12b may adhered to the boot insert 66, either by hand, heating or through some other automated process. The boot insert may comprise any material such plastic, fabric, or the like. In one preferred embodiment of the present invention, the boot insert is neoprene. In one embodiment of the invention, the opening 68 of the boot shell 12 is formed in the boot shell 12 by the arm 26 that extends from the inner surface 24 of the upper mold 18 to suspend the last 22 within the cavity 38 or the upper portion of the last 22.

The natural rubber pieces 36 described above may be made from a rubber formula free from plastics and other synthetic or polymeric materials. Table I below describes the ingredients and method of making a rubber formula according to one embodiment of the invention. A benefit of the rubber formula described below is that it is resistant to slipping on ice. The below is listed in parts per hundred (PHR).

TABLE 1

| Ingredients | (PHR) | Working procedure |
| --- | --- | --- |
| SSBR 2003 | 30.00 | Separate packing request for each |
| BR-9000 | 50.00 | chemical |
| BIIR 2030 | 20.00 | 1. Weigh each chemical except for |
| Petroleum Resin | 8.00 | TS/S, and put them separately |
| W/CARBON | 60.00 | Mixing |
| OIL | 20.00 | Mix all the rubber and petroleum Resin |
| 1956 | 0.50 | until it has a smooth surface |
| MgO | 1.00 | Mixing in the milling machine |
| ST.E | 1.00 | 1. Add mixed rubber and mix for 60 |
| SP/C | 2.00 | secs |
| PEG-4000 | 6.00 | 2. Add chemicals and mix for 60 secs |
| ZnO | 4.00 | 3. Add filling agent and mix for 240 |
| DM | 1.50 | sec |
| M | 0.70 | 4. Mix another 180 secs after clearing |
| TS | 0.15 | 5. Decline hammer and add mixing |
| S | 2.00 | rubber |
| 48.3% | 206.85 | Mixing with the Calendar Machine |
| | | 1. 6-8 mm (calendar roll gap) Pull the sheet |
| | | 2. 1-2 mm Wrap the rubber into a triangle two times |
| | | 3. 6-8 mm Take the rubber out and cool |
| | | Vulcanization |
| | | 1. 4-6 mm (Calendar roll gap) add color/S/TS |
| | | 2. 1-1.5 mm Wrap the rubber into a triangle three times |

TABLE 1-continued

| Ingredients | (PHR) | Working procedure |
| --- | --- | --- |
| | | 3. 6-8 mm Take the rubber out and cool |

Elements listed in the table above include styrene butadiene rubber (SSBR 2003), butadiene rubber (BR 9000), and brominated butyl rubber (BIIR 2030). Additional elements include petroleum resin, white carbon black (W/CARBON), and soften oil (OIL). Yet other elements include antifoggant (1956), activated magnesium oxide (MgO), active stearic acid (ST.E), polyvinyl alcohol (PEG 4000), zinc oxide (ZnO), dithiazole mercaptothiazole (DM), and mercaptothiazole (M). Other elements use during vulcanization include an active vulcanizing agent (TS) and Sulphur (S). As such, the rubber formula does not include plastics or other synthetic materials.

The rubber formula includes a selection of mixed rubber, a selection of chemicals, and a selection of filling agents. The selection of mixed rubber may include styrene butadiene rubber (SSBR 2003), butadiene rubber (BR 9000), and brominated butyl rubber (BIIR 2030). The selection of chemicals may include petroleum resin and white carbon black (W/CARBON). The selection of filling agents may include soften oil (OIL), antifoggant (1956), activated magnesium oxide (MgO), active stearic acid (ST.E), polyvinyl alcohol (PEG 4000), zinc oxide (ZnO), dithiazole mercaptothiazole (DM), and mercaptothiazole (M).

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A one-piece rubber boot shell created by a process comprising the steps of:
    disposing one or more pieces of natural rubber within one or more cavities of a molding machine in an open position, the molding machine having an upper mold, a lower mold, and a last suspended between the upper mold and the lower mold and spaced apart from the upper mold and lower mold when in the open position;
    transitioning the molding machine to a closed position by moving at least one of the upper mold, the lower mold, and the last toward each other so that they are adjacent each other;
    heating the one or more rubber pieces to flow within the cavity and around the last to form a one-piece rubber boot shell; and
    opening the molding machine by moving at least one of the upper mold, the lower mold, and the last away from each other so that they are spaced apart from each;
    removing the one-piece rubber boot shell from the last.

2. The process of claim 1 wherein heating the rubber pieces comprises heating the rubber pieces to at least approximately 155° Celsius for at least approximately 800 seconds.

3. The process of claim 1 further comprising cooling the temperature of the one-piece rubber boot shell to approximately 150° Celsius before opening the molding machine.

4. The process of claim 1 further comprising cooling the one-piece rubber boot shell for a time period of about 10 seconds or more before opening the molding machine.

5. The process of claim 1 wherein disposing one or more rubber pieces within a cavity of a molding machine comprises disposing a first set of one or more rubber pieces on an outer surface of the last and a second set of one or more rubber pieces on an inner surface of the lower mold.

6. The process of claim 1 further comprising an arm extending from the upper mold and supporting the last within the cavity of the molding machine, wherein heating the one or more rubber pieces to flow within the cavity and around the last includes the rubber flowing around the arm to create an opening in an upper portion of the one-piece rubber boot shell.

7. The process of claim 1 wherein closing the molding machine comprises enclosing the cavity between the inner surface of the upper mold, the inner surface of the lower mold, and the outer surface of the last.

8. A method of manufacturing a one-piece rubber boot shell comprising:
- opening a molding machine, the molding machine including an upper mold, a lower mold, an arm extending from an inner surface of the upper mold, and a last disposed at a lower end of the arm, the last suspended between and spaced apart from the upper mold and the lower mold when in an open position;
- disposing one or more rubber pieces on an outer surface of the last;
- disposing a one or more rubber pieces on an inner surface of the lower mold;
- closing the molding machine by moving at least one of the upper mold, the lower mold, and the last toward each other to create a mold;
- heating the rubber pieces so that they liquify and flow within the mold and around the last to form a one-piece rubber boot shell;
- opening the molding machine by moving at least one of the upper mold, the lower mold, and the last away from each other; and
- removing the one-piece rubber boot shell from the last.

9. The method of claim 8 wherein the rubber pieces are heated to at least approximately 155° Celsius for at least approximately 800 seconds.

10. The method of claim 8 wherein the one-piece rubber boot shell is cooled to approximately 150° Celsius or lower.

11. The method of claim 10 wherein the one-piece rubber boot shell is cooled at the ambient temperature for a time period of approximately 10 seconds or more.

12. The method of claim 8 wherein closing the molding machine forms a substantially contiguous cavity between the inner surface of the upper mold, the inner surface of the lower mold, and the outer surface of the last.

13. The method of claim 8 wherein heating the first and second sets of rubber pieces further comprises flowing within the mold and around the arm to create an opening in an upper portion of the one-piece rubber boot shell.

14. The process of claim 1 wherein transitioning the molding machine to a closed position further comprises holding the upper mold stationary, moving the last upward to a location adjacent an inner surface of the upper mold, and moving the lower mold upward to a location adjacent the last and in contact with the upper mold to enclose the cavity.

15. The process of claim 1 wherein transitioning the molding machine to a closed position further comprises holding the upper mold and last stationary and moving the lower mold upward to a location adjacent the last and in contact with the upper mold to enclose the cavity.

16. The process of claim 1 wherein transitioning the molding machine to a closed position further comprises holding the last stationary, moving the upper mold downward to a location adjacent the last and in contact with the lower mold, and moving the lower mold upward to a location adjacent the last and in contact with the upper mold to enclose the cavity.

17. The process of claim 1 wherein transitioning the molding machine to a closed position further comprises holding the lower mold stationary, moving the last downward to a location adjacent an inner surface of the lower mold, and moving the upper mold downward to a location adjacent the last and in contact with the lower mold to enclose the cavity.

18. The process of claim 1 wherein transitioning the molding machine to a closed position further comprises holding the lower mold and the last stationary and moving the upper mold downward to a location adjacent the last and in contact with the lower mold to enclose the cavity.

* * * * *